United States Patent [19]

Sjöholm et al.

[11] 4,217,647

[45] Aug. 12, 1980

[54] PROCESS CONTROL VALVE APPARATUS

[75] Inventors: Claes B. Sjöholm, Malmö; Bengt O. Johansson, Lund, both of Sweden

[73] Assignee: Alfa-Laval AB, Tumba, Sweden

[21] Appl. No.: 950,649

[22] Filed: Oct. 12, 1978

[30] Foreign Application Priority Data

Oct. 17, 1977 [SE] Sweden ................................ 7711656

[51] Int. Cl.² ...................... G06F 15/20; F16K 11/10
[52] U.S. Cl. ................................ 364/510; 137/624.11; 137/884
[58] Field of Search ....................... 364/100, 509, 510; 137/884, 624.11, 624.18

[56] References Cited

U.S. PATENT DOCUMENTS

| | | | |
|---|---|---|---|
| 3,589,387 | 6/1971 | Raymond | 137/884 X |
| 3,785,389 | 1/1974 | Friedland et al. | 137/884 X |
| 3,878,376 | 4/1975 | Sholes, Jr. et al. | 364/509 |
| 4,074,354 | 2/1978 | Nakagawa et al. | 364/510 X |
| 4,095,864 | 6/1978 | Hardin | 137/884 X |

Primary Examiner—Joseph F. Ruggiero
Attorney, Agent, or Firm—Beveridge, DeGrandi, Kline & Lunsford

[57] ABSTRACT

A housing (11) which is intended for mounting on a process control valve (5) contains electric circuits (3) and means (4) controlled by these circuits for converting electric control signals into operating signals which operate the valve via a cylinder. The electric control signals are supplied via a serializing terminal (7) from the computer (1) of a process control system which includes a plurality of process control valves (5). The housing has a single interconnection (14) with a cable (8) common to several process control valves for transmitting the control signals and for supplying the electric circuits with power. The housing moreover has a single connecting socket (13) to permit coupling the housing to a pressure air line common to a plurality of valves (5).

4 Claims, 6 Drawing Figures

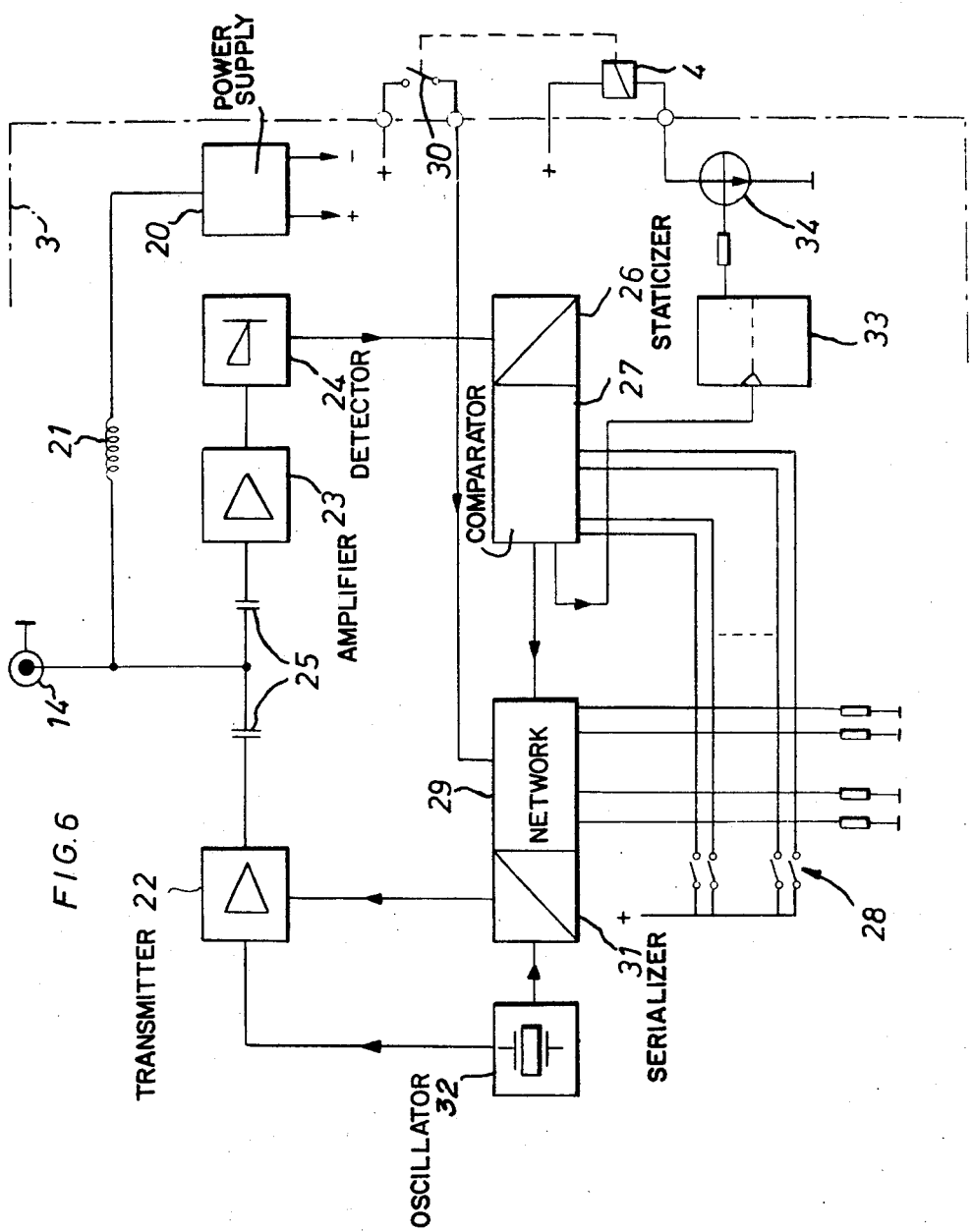

PROCESS CONTROL VALVE APPARATUS

This invention generally relates to a process control system equipped with a computer and having a great many process control valves, and more particularly to an apparatus for use in such a system to convert control signals from the system computer into operating signals for one of the valves by means of electric circuits for transmitting, receiving and storing data signals and means controlled by the electric circuits for the production of the operating signals.

Process control systems which are equipped with computers usually comprise, in addition to the computer proper with associated operator console, a bus cable for parallel transmission of data. Via said bus cable the computer is connected to a plurality of interface units each of which in turn is connected to one group of operating means (such as solenoid valves) which can operate a corresponding number of process control means (such as pneumatic process valves).

The disadvantages from which such a system suffers, inter alia reside in its requirement for a comprehensive wiring of relatively qualified nature and claims for a certain excess capacity to avoid, when changes of or additions to the system are necessary, a sudden heavy increase of the amount of inherent equipment.

Apart from the computer and associated operator console, an alternative process control system can comprise a bus cable to which all process control means are connected, each via one operating means and one interface unit to be sequentially addressed by the computer. The disadvantages associated with this alternative system inter alia reside in that the cycle time, i.e. the time between the consecutive addressings of one and the same process control means, may become impractically long because it is directly proportional to the total number of process control means in the system.

One object of the present invention is to provide a process control valve apparatus by means of which the wiring in a process control system as well as the entire build-up of the system can be considerably simplified, without too long a cycle time.

The invention thus above all has for its object to simplify process control systems and make them less expensive in respect of manufacture and installation as well as operation.

To this end, the process control valve apparatus comprises a housing which can be assembled with the valve to form a unit, accommodates the electric circuits as well as the means controlled thereby and has a connection for coupling the electric circuits to a two or three-core cable common to a plurality of valves for transmitting the data signals and for supplying the electric circuits with power.

The invention will be described in greater detail below with reference to the accompanying drawings in which FIG. 1 schematically illustrates a process control system of the type mentioned in the introduction;

FIG. 2 schematically illustrates a process control system according to the present invention;

FIG. 3 by way of Example shows the mechanical construction of a process control valve device according to the invention;

FIGS. 5 and 6 are a block diagram and a combined block and circuit diagram, respectively, of the electric circuits provided in one embodiment of the process controlled valve apparatus according to the invention.

Figure 1:
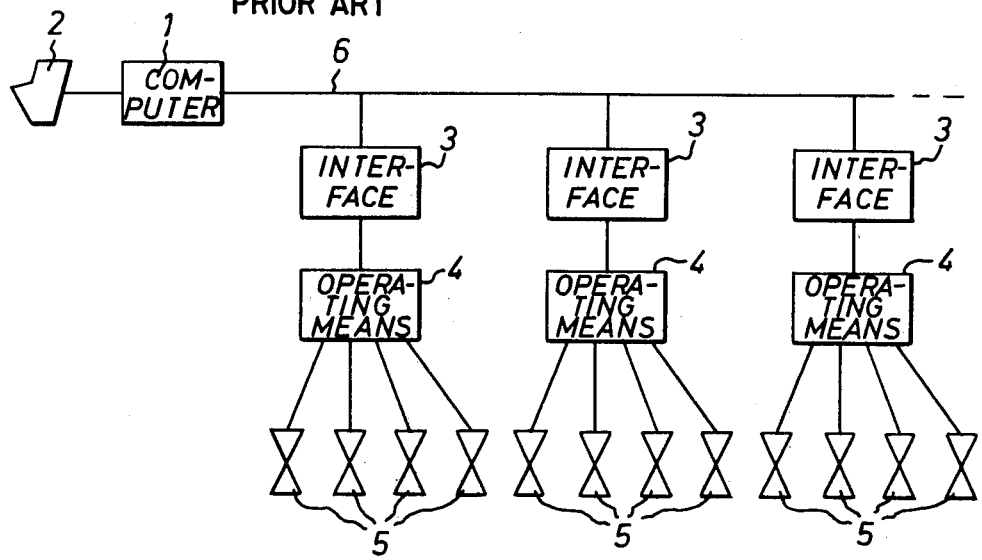

The process control system illustrated in FIG. 1 comprises a computer 1 with associated operator console 2. The computer 1 contains all logic necessary to make the process function and delivers and collects the necessary information via a plurality of interface units 3 which are each electrically connected to one group of operating means 4. The operating means of such a group may be solenoid valves which are in communication, for instance via pressure air hoses, with process control means 5 in the form of pneumatic valves. The connection between the computer 1 and the interface unit 3 is established by a so-called bus cable 6 via which said information is transmitted in a parallel manner. The interface units 3 normally contain decoders, storage circuits and operating stages for the solenoid valves which are generally grouped in separate cabinets from where pressure air hoses extend to the pneumatic valves.

Figure 2:
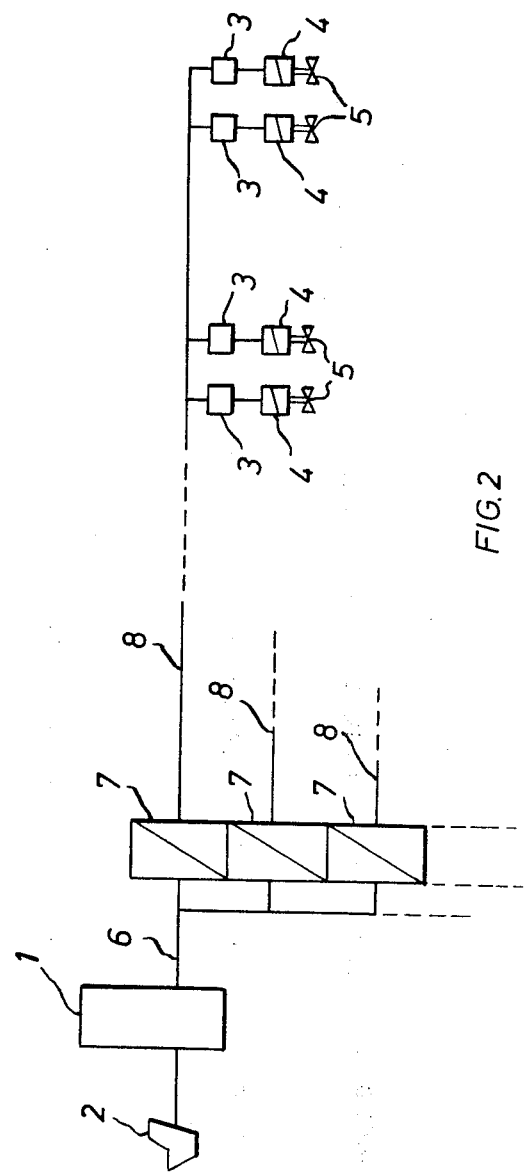

The process control system according to the invention illustrated in FIG. 2 eliminates the disadvantages of the system shown in FIG. 1 without too long a cycle time. According to the invention, a plurality of terminals 7 are connected to the computer 1 via the bus cable 6. From each terminal 7 there extends a control line 8 to a number of interface units 3 which are directly connected each with one operating means 4 for a process control means 5. The bus cable 6 in this case is designed for parallel transmission of data while the control lines 8 are designed for serialized transmission of data. It is readily seen that reason of this construction of the process control system it is possible to reduce the number of process control means 5 per control line 8 and thus also the cycle time.

Figure 3:
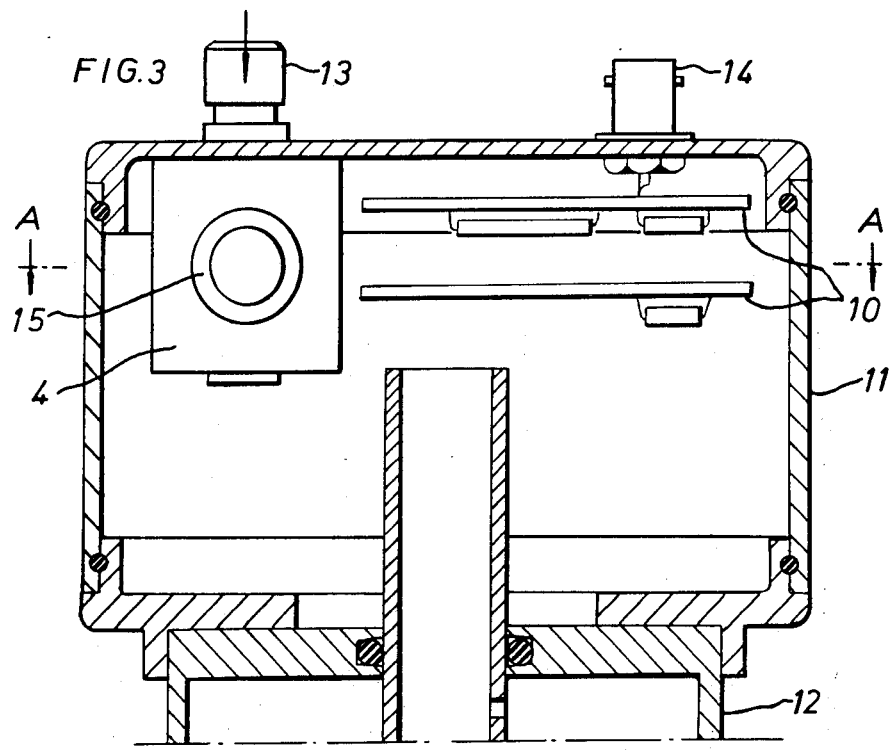
Figure 4:
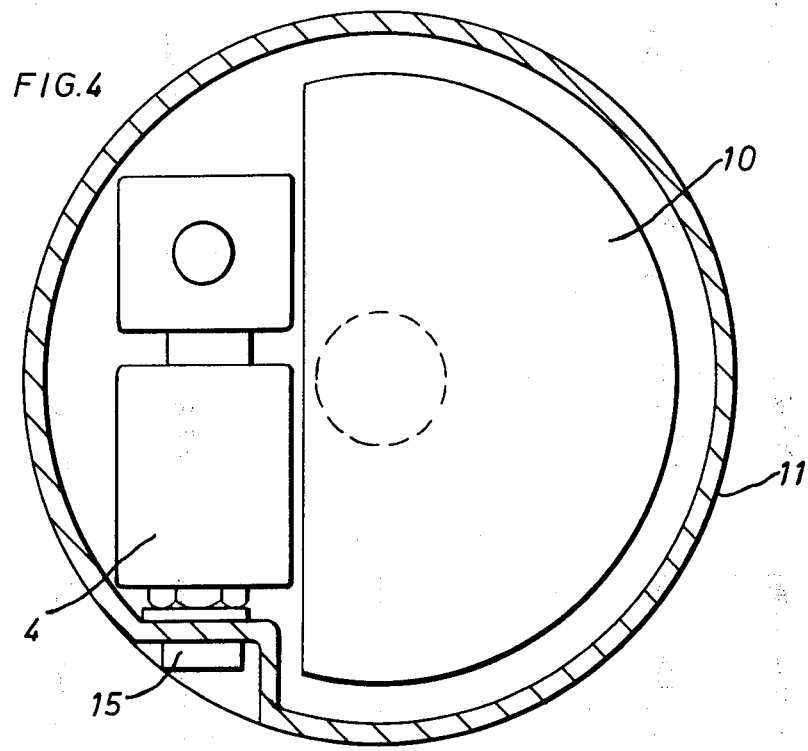
FIG. 4 is a cross-sectional view on the line A—A in FIG. 3.

According to the invention each process control means 5 is assembled into a unit with the associated interface unit 3 and operating means 4. As shown in FIGS. 3 and 4 an operating means 4 in the form of a solenoid valve for pressure air and an interface unit 3 consisting of two circuit cards 10 are accommodated in a housing 11 which is mounted on an air cylinder 12 which in turn is assembled with the process valve (not shown) for setting said valve. The only outer connections leading to the process control valve apparatus in FIGS. 3 and 4 are a pressure air inlet 13 and a coaxial connector 14. An outlet 15 for return air is also provided.

Figure 5:
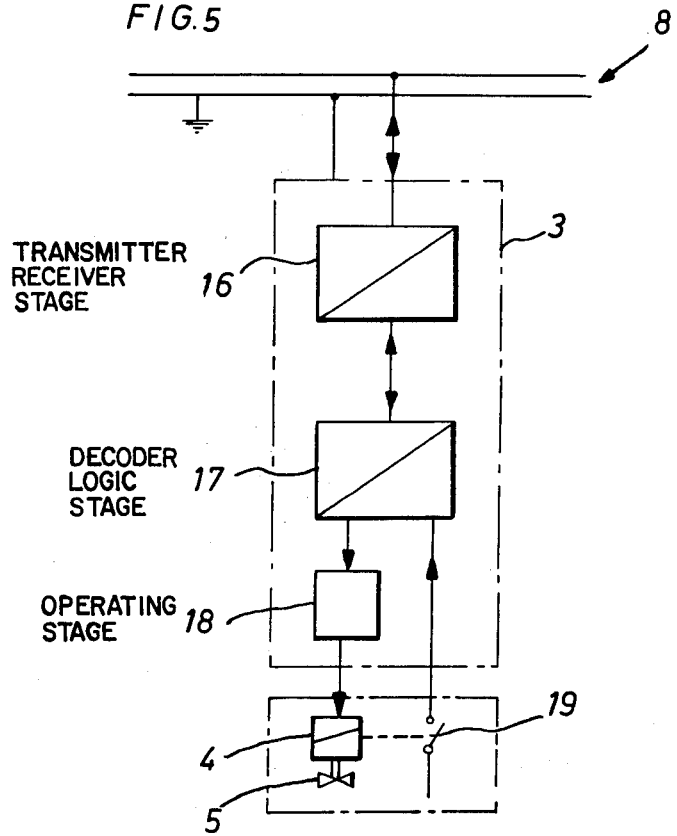

As shown in FIG. 5 each interface unit 3 of the process control valve apparatus according to the invention may contain a transmitter/receiver stage 16 which via a decoder/logic stage 17 is connected to an operating stage 18 for the operating means 4. The decoder/logic stage 17 also has an inlet connected to for instance a transmitter 19 for indicating the position of the process control means 5 so that the computer 1 can have the acknowledgement that an order sent to a process control means 5 has been carried out.

In FIG. 6 the interface unit 3 of the process control valve apparatus according to the invention is illustrated in greater detail. An electric power supply 20 for supplying the electric circuits of the interface unit 3 and the solenoid valve 4 with electric power is connected to the coaxial connector 14 via a choke 21. A transmitter 22 and a receiver consisting of an amplifier 23 and a detector 24 are also connected each via one capacitor 25 to the coaxial connector 14. The output of the detector 24 is connected to a staticizer 26 the outputs of which are connected to one set of inputs (not shown) of a comparator 27. The other set of inputs of the comparator 27 can be selectively made alive by switches 28. The output of the comparator 27 is connected to an input of a combinatorial network 29 which also has inputs connected to the other set of inputs of the comparator 27 and an input connected to a contact 30 controlled by the operating means 4. The outputs of the network 29 are connected (not shown) to the inputs of a serializer 31 the output of which is connected to the transmitter 22. An oscillator 32 is connected to both the transmitter 22 and the serializer 31. The comparator 27 also has an output connected to the input of a flip-flop 33 one output of which is connected to the base of an operating transistor 34 in the collector circuit of which the coil of the solenoid valve 4 is connected.

The circuits shown in FIG. 6 function as follows: Via the coaxial connector 14 which is intended for connection to a coaxial cable forming the control line 8 there is supplied a D.C. voltage which is conducted via the choke 21 to the electric power supply 20. A serial information signal transmitted from the associated terminal 7 via the coaxial cable is a modulated carrier frequency signal and is fed via one capacitor 25 to the amplifier 23 for adjustment of level. The amplified signal is then detected in the detector 24 which delivers to the staticizer 26 a binary pulse train which contains an address portion and an instruction portion. When and only when the address portion coincides with the address of the process control valve apparatus, which is settable by means of the switches 28 the comparator 27 delivers an output signal to the combinatorial network 29, whereby the address, such as it has been set by means of the switches 28, is transmitted via the serializer 31 and the transmitter 22 in serial form on the control line 8 back to the terminal 7. Information about the state of the contact 30 is also fed via the combinatorial network 29, the serializer 31 and the transmitter 22 to the terminal 7. The oscillator 32 controls the frequency of the transmitter 22 as well as the output of data from the serializer 31, which data modulate the output signal of the transmitter 22. In response to the contents of the instruction portion a setting signal is supplied or not supplied to the input of the flip-flop 33. If the flip-flop 33 is set the conductivity state of the transistor 34 is changed and the contact 30 is caused to change position. Information about the changed position of the contact 30 is sent in the above described manner after the address portion to the associated terminal 7.

By designing a process control system in accordance with the invention the number of process control means per control line can thus be limited (for instance to sixty-four control means), whereby a short cycle time can be maintained.

It is also realized that, compared to the system outlined in FIG. 1, the process control system according to the invention implies considerable savings with regard to wiring and also with regard to the running of pressure air hoses. Further savings in the electrical wiring is obtained according to the invention in that the supply of power to the interface units 3 and the operating means 4 takes place via the control lines 8.

To sum up, a number of advantages are gained by the process control valve apparatus according to the invention.

With regard to manufacture the present invention implies savings of cost provided the entire process control system is taken as the basis of the comparison.

A process control system in which use is made of the apparatus according to the present invention is simpler to install than a conventional process control system since a common cable can be used for all controlled objects (valves) and also common air supply can be utilized. It is cheaper since a common cable is used instead of 4–5 conductors per object, more rapid since no electric or air lines specific to individual objects occur and therefore no wrong connections can be made. It is safer, which permits installation of the apparatus by unskilled persons, and it requires less space since, for instance, the separate solenoid valve cabinets are dispensed with.

Advantages are gained by the invention with regard to operation and maintenance by simplified fault localization since malfunctions can be directly localized to the object in question, by simple exchange since the entire housing can be exchanged without the assistance of electricians by reason of the common connection of electric power and air lines to all objects, and since an object can be shifted on the same bus cable by unskilled persons without any change of programs.

Further, a process control system in which use is made of the apparatus according to the invention will be more flexible than a conventional process control system since further objects can be readily connected to the common cable and the common air line. In a conventional system the connection of further objects may entail great problems and high costs, for instance when an interface or solenoid valve cabinet is full.

Several modifications of the embodiments described in the foregoing are, of course, possible within the scope of the invention. By way of example, the control line 8 could contain three wires, so that the current supply and the information transmission could be separated. A two-core coaxial cable, however, is the preferred embodiment.

What we claim and desire to secure by Letters Patent is:

1. An apparatus for use in a process control system equipped with a computer and having a plurality of process control valve units which convert control signals from the system computer into operating signals for one of the valves, said control valve units including electric circuits (3) for transmitting, receiving and storing data signals and means (4) controlled by the electric circuits for the production of the operating signals, said apparatus comprising a housing (11) which is mounted on the valve (5) to form a unit, electric circuits (3) located in said housing for transmitting, receiving and storing data signals, means (4) in the housing for producing valve-operating signals in response to signals from the electric circuits, a connection (14) on the housing for coupling the electric circuits to a two-core or three-core cable (8) which leads to a plurality of valve units and transmits the data signals and supplies the electric circuits with electric power.

2. An apparatus as claimed in claim 1, in which the operating signals are pneumatic, said housing (11) having a single connecting socket (13) for coupling the housing to a pressure air line common to a plurality of valves (5).

3. The apparatus of claim 1 or claim 2 in combination with a computer and including a plurality of said valve units, a cable engaged with said connections of said valve units, said cable including conductor means for transmitting data signals and for providing electric power to the electric circuits.

4. The apparatus of claim 3 wherein the means for producing the valve-operating signals is a solenoid valve, said solenoid valve being connected to a fluid-operated valve actuator.

* * * * *